Oct. 22, 1968   L. A. LE SEELLEUR ET AL   3,407,121
FERMENTER YEAST CROPPING AND WASHING DEVICE
Filed June 29, 1965                           2 Sheets-Sheet 1

Inventors
LOUIS ALFRED LeSEELLEUR
& GERALD EINAR WILSON by: *Marks & Clerk*

Oct. 22, 1968　　L. A. LE SEELLEUR ET AL　　3,407,121
FERMENTER YEAST CROPPING AND WASHING DEVICE
Filed June 29, 1965　　2 Sheets-Sheet 2
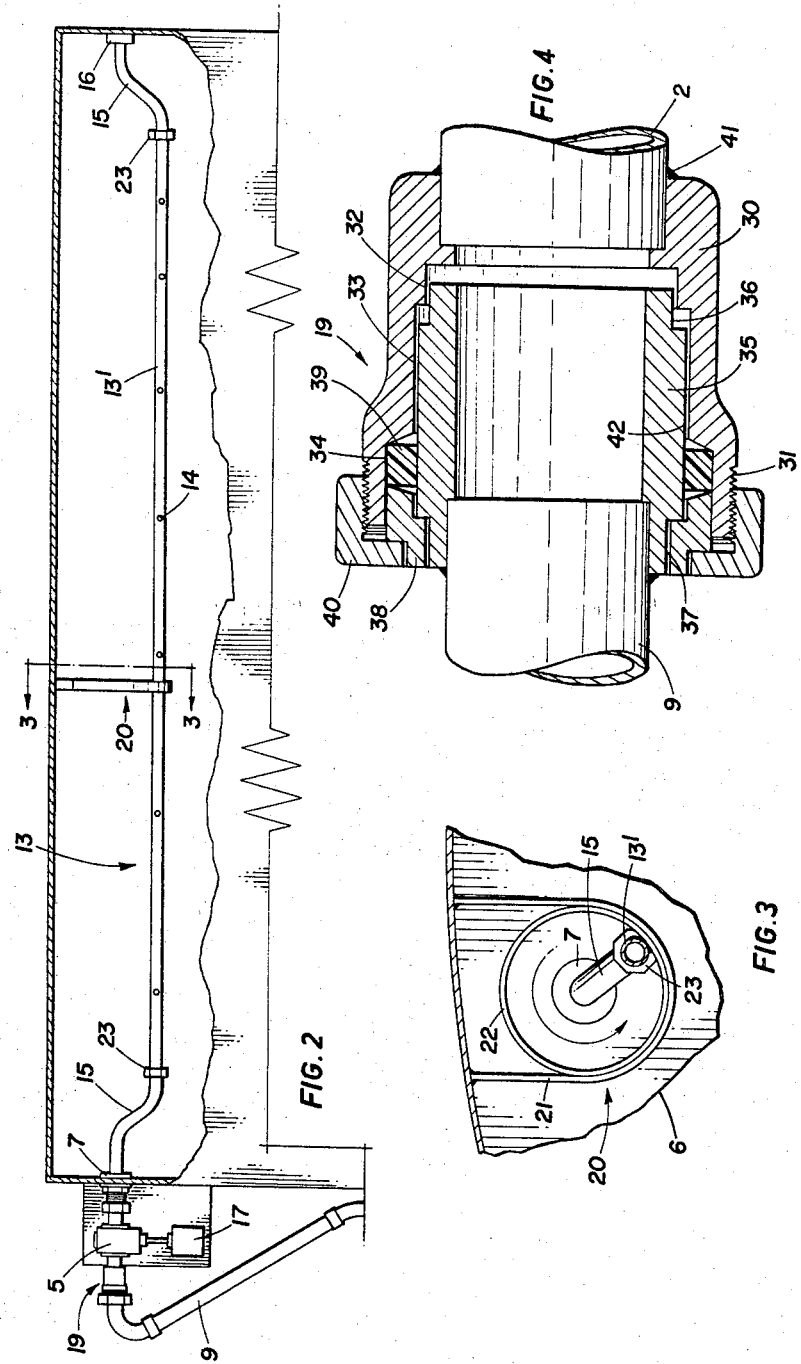
Inventors
LOUIS ALFRED LeSEELLEUR
& GERALD EINAR WILSON
by: *Marks & Clerk*

United States Patent Office 3,407,121
Patented Oct. 22, 1968

3,407,121
FERMENTER YEAST CROPPING AND WASHING DEVICE
Louis A. Le Seelleur and Gerald Einar Wilson, London, Ontario, Canada, assignors to John Labatt, Limited, London, Ontario, Canada
Filed June 29, 1965, Ser. No. 467,860
10 Claims. (Cl. 195—134)

ABSTRACT OF THE DISCLOSURE

A fermenter vessel containing a yeast cropping and cleaning device consisting of a rotatable header pipe in the upper portion of the vessel with an end of the pipe extending outside the vessel and a series of orifices opening from the header into the vessel. The orifice outlets are offset a substantial distance radially from the axis of rotation of the header pipe either by providing an offset portion in the header pipe itself or by providing a series of branch pipes extending laterally from the header pipe with nozzles on the outer ends thereof. Conduit means connected to the external end of said header pipe by means of a connector and suction means associated with said conduit for cropping the yeast.

---

This invention relates to a yeast cropping and washing device for closed fermenting vessels used in the brewing industry.

The fermentation of wort is one of the most important steps in the brewing process. Brewers' yeast, having the ability to assimilate simple nitrogenous compounds and reproduce and break down sugars to carbon dioxide and alcohol are introduced into the wort, whereupon through a controlled biological fermentation process, the wort is transformed into beer. The fermentation of wort is usually an operation carried out under relatively low pressure (1–3 p.s.i.g.) in large metal fermenting vessels capable of holding thousands of gallons of wort. The modern fermenting vessel is a closed vessel such as that described in applicant's copending application entitled, "Multipurpose Process Vessel for Heat Transfer Operations."

During the fermentation, top fermenting yeast forms on the surface of the liquid in the vessel and this is normally removed by skimming or is allowed to work over the rim of a tank into chutes or troughs. In the closed vessel it is, of course, necessary to use some form of yeast cropping device and according to the present invention a new device has been developed which can be used both for cropping yeast from the surface of the beer in the fermenter and for cleaning the fermenter aftre the beer has been removed.

The cropping and cleaning device according to this invention consists of a horizontally extending pipe which is rotatable within the fermenter and the rotatable pipe has a series of orifices which are adapted to draw off yeast from the fermenter or to spray cleaning solution into the fermenter. The pipe is arranged such that by rotating it the elevation of the orifices can be varied to permit the yeast to be drawn off to the desired level. One end of the rotatable pipe has a fluid connection to an external pipe through a connector which permits relative rotation between the two pipes while fluid is passing through. Suitable valve means are provided so that cleaning solution can be forced into the vessel or yeast can be drawn out of the vessel through the connector and rotatable pipe.

The connector is a specially developed sanitary gland coupling which forms a liquid seal by means of a thrust bearing and packing as described in greater detail hereinafter. The rotatable pipe can be conveniently rotated by a gear device such as that commercially available under the trademark HOLROYD "HO." This type of gear device can be manually operated by means of a handwheel or it can be hydraulically operated or electrically operated by means of an electric motor and reducer.

According to one embodiment of the invention the rotatable pipe is provided with a series of laterally extending branch pipes having rotatable nozzles on their outer ends remote from the rotatable pipe. Each of the branch pipes preferably consists of a long portion adjacent the rotatable pipe connecting with a short portion adjacent the nozzle, the two portions being at an angle to each other. The angle between the two portions is suitably about 70° so that in normal operating position the long portion of each branch pipe will extend upwardly from the rotatable pipe at angle of about 20° to the horizontal while the short portion will be substantially vertical.

For cleaning the vessel, the branch pipes are in the normal operation position as mentioned above. This means that the portion of each branch pipe supporting a rotatable nozzle is substantially vertical so that each nozzle rotates about a vertical axis while cleaning solution is being sprayed into the vessel. The rotating nozzles provide an efficient cleaning of all interior surfaces of the vessel.

When the device is used for drawing off yeast from the vessel it will be evident that the elevation of the nozzles can be varied by rotating the rotatable pipe. With this embodiment the rotatable pipe is preferably offset laterally from the center of the vessel a distance approximately equal to the length of the long portion of a branch pipe. This places the nozzles at approximately the center-line of the vessel, which is particularly desirable for uniform cleaning of the vessel.

In accordance with another embodiment of the invention, the rotatable pipe is formed with a substantial portion of its length within the vessel offset from the axis of rotation of the pipe. A series of orifices are provided in the offset portion of the pipe, which orifices are used either to draw off yeast from the vessel or to spray cleaning solution into the vessel. With this arrangement the pipe is supported in the vessel such that is can rotate through a complete circle.

To control the level to which yeast is to be drawn off, the rotatable pipe is simply rotated until the offset portion is at the desired level. When the device is used for washing the vessel, the rotatable pipe is set into rotation by means of an electric motor and cleaning solution is sprayed into the vessel under pressure through the orifices while the pipe is rotating. The rotating spray which is created provides very efficient cleaning of the inside of the vessel.

The invention will now be described by reference to the attached drawings in which:

FIGURE 2 is a profile drawing of an alternate embodiment of the invention with the top portion of the vessel broken-away to reveal the internal piping arrangement.

FIGURE 3 is a sectional view of the pipe hanging arrangement along the ilne 3—3 in FIGURE 2.

FIGURE 4 is a sectional view of the sanitary gland coupling.

Figure 1:
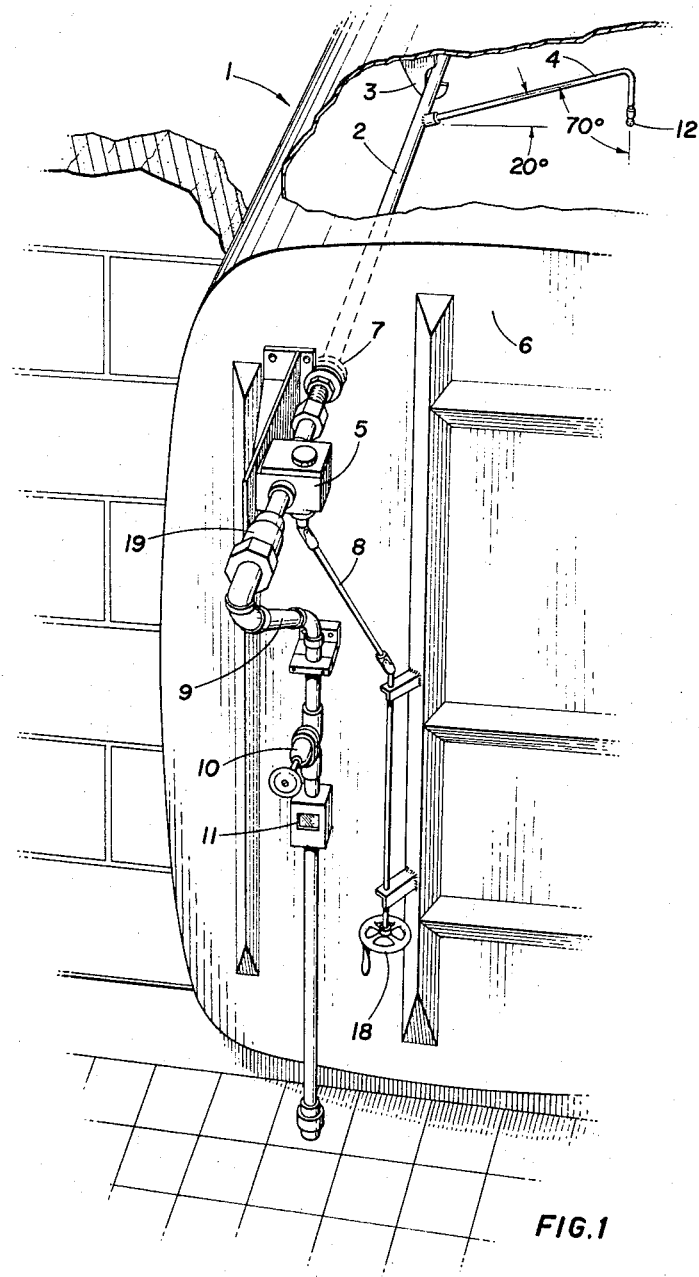
FIGURE 1 is a perspective illustration of an arrangement of the invention with a broken-away portion of the fermenter vessel revealing the internal piping.

As shown in FIGURE 1, an enclosed fermenter vessel 1 contains a header pipe 2 supported in the vessel by means of hangers 3. The pipe 2 is adapted to be rotatable in the hangers 3 and pipe 2 has extending laterally therefrom branch pipes 4. As mentioned above, the pipe 2 is preferably offset laterally from the center of the vessel so that when the branch pipes 4 are in operational position the outer ends of the arms will be substantially at the centre of the vessel.

The pipe 2 is connected to a gear device 5, of known construction, which rotates pipe 2. Pipe 2 is also connected to a sanitary gland coupling 19 which permits pipe 2 to rotate while pipe 9, which is also connected to coupling 19, remains stationary. The gland coupling 19 is designed to satisfactorily withstand both vacuum and pressure. The pipe 2 passes through the wall 6 of the vessel 1 through a gland 7. The gear device 5 can be manually operated by means of an extending shaft 8 which is connected to a hand-wheel 18. Pipe line 9 is used to pump cleaning solution into the vessel or to withdraw the yeast from the vessel and includes in it adjacent to the vessel a valve 10 as well as a sight glass 11.

It will be seen that the pipe 4 is bent at an angle of approximately 70° at its outer end and has connected to the outer end thereof a spray nozzle 12 which is adapted to rotate under fluid pressure. A suitable spray nozzle has been found to be that available under the trademark Whirlybird. When cleaning solution is being sprayed into the vessel, the nozzle 12 rotates, providing efficient washing of all of the walls of the vessel. The position of the nozzles shown in FIGURE 1 is the normal cleaning position, while the nozzle 12 can be swung to any desired elevation for the removal of yeast.

A second embodiment of the invention is shown in FIGURE 2, according to which in place of the laterally extending branch pipes there is used a perforated pipe 13 which is provided with a longitudinal portion 13' which is offset from the axis of rotation of the pipe by offset arms 15, such that the elevation of the portion 13' can be varied in the vessel by rotating the pipe. The pipe 13 is supported at one end by support mount 16 and at the other end by the gland 7, while being supported by hanger 20 in the middle. The gear device 5 is shown operated by an electric motor 17 and it will be evident that by the operation of the motor the elevation of the offset portion 13' of the pipe can be varied for the skimming of yeast and the pipe can also be rotated while cleaning solution is being sprayed through it in order to provide efficient washing of the vessel. The distance of the offset will be dependent upon the normal variation in liquid level to be encountered in the vessel and the pipe can be positioned at the center of the vessel.

The offset portion 13' is connected at each end to offset arms 15 by couplings 23 which permit portion 13' to be rotated about its axis in order to vary the position of the holes, depending on the purpose for which the device is being used. It will, of course, be appreciated that for very large vessels a number of such perforated pipes may be used.

It is important that when the pipe is used for cropping yeast a uniform suction is applied along the length of the pipe. One method of achieving this is to progressively decrease the distance between holes along the pipe in a direction away from the suction end of the pipe. A satisfactory arrangement for cropping yeast with a 20 foot long 2 inch diameter pipe was to provide seven holes of ⅛ inch diameter spaced at uniformly varying distances along the 20 foot pipe such that the most closely spaced pair of holes are about six inches apart while the most widely spaced pair of holes are about two feet apart.

A detailed view of hanger 20 is shown in FIGURE 3. This hanger is specially designed for supporting an offset pipe and consists of a metal strap 21 fixed to the top wall of the vessel by both ends so as to form a U-shaped support and a metal hoop 22. The offset portion 13' of pipe 13 is welded to the inside face of the hoop. Since the hoop 22 has a diameter equal to the diameter of rotation of the offset portion 13' of pipe 13, it will support the pipe in any position of rotation.

The sanitary gland coupling 19 as shown in detail in FIGURE 4 consists of a brass coupling member 30 permanently fixed to pipe 2 by brazing all around at junction 41.

Coupling member 30 has an external thread 31 at the end opposite to the end fixed to pipe 2, and also has a stepped interior diameter consisting of three steps 32, 33 and 34 of progressively larger diameters.

An annular brass bushing 35 is welded to pipe 9 and this bushing has a stepped external surface with step 36 at one end and step 37 at the other end. The bushing 35 is arranged such that its main external surface 42 is a turning fit within step 33 of coupling 30 while the step 36 of bushing 35 is a turning fit in step 32 of coupling 30. A brass thrust bearing 38 is arranged between step 34 of coupling 30 and the bushing 35 such that there is a turning fit between the parts. The portion of thrust bearing 38 between step 34 of coupling 30 and bushing 35 is considerably shorter than the length of the step, leaving an annular space which is filled by Teflon packing ring 39. The entire gland coupling is then held together by means of threaded nut 40 which is screwed onto the thread 31 of coupling member 30.

This arrangement permits turning of pipe 2 with respect to pipe 9 while the combination of seals and bushings provides a sanitary fitting which is equally suited for use with suction or pressure.

We claim:

1. A fermenter vessel including a yeast cropping and cleaning device comprising a header pipe extending substantially horizontally in the upper portion of said fermenter vessel such that at least one end of the header extends outside the vessel, said header pipe being provided with a series of orifices opening into the vessel and being adapted to rotate about a substantially horizontal axis, said header pipe and orifices being arranged such that the orifice outlets are offset a substantial distance radially from the axis of rotation of the header pipe, conduit means connected to said external end of said header pipe by means of a connector suction means associated with said conduit for cropping the yeast, said connector being adapted to permit rotation of said header pipe with respect to said conduit while fluid is flowing between said conduit and said header and means for rotating said header.

2. A fermenter vessel including a yeast cropping and cleaning device comprising a header pipe extending substantially horizontally in the upper portion of said fermenter vessel such that one end of the header extends through an end wall of the vessel, said header being adapted to rotate about a substantially horizontal axis and having a series of branch pipes extending laterally therefrom, nozzles dapted to rotate under fluid pressure connected to the ends of said branch pipes remote from said header, conduit means connected to the external end of said header pipe by means of a connector suction means associated with said conduit for cropping the yeast, said connector being adapted to permit rotation of said header pipe with respect to said conduit while fluid is flowing between said conduit and said header, and means for rotating said header.

3. A fermenter with a yeast cropping and cleaning device according to claim 2, wherein the rotating means is a gear device.

4. A fermenter with a yeast cropping and cleaning device according to claim 3 wherein the gear device is manually operable.

5. A fermenter with a yeast cropping and cleaning device according to claim 2 wherein each branch pipe consists of a long portion adjacent the header and a short portion remote from the header, the two portions being at an acute angle to each other such that when the short portion is in a vertical position the long portion is inclined upwardly at a small angle to the horizontal.

6. A fermenter vessel including a yeast cropping and cleaning device comprising a header pipe extending substantially horizontally in the upper portion of said fermenter vessel such that one end of the header extends through an end wall of the vessel, said header being adapted to rotate about a substantially horizontal axis and having a substantial portion of its length within the vessel offset from its axis of rotation, a series of orifices provided in the offset portion of the header, conduit means connected to the external end of said header pipe by means of a connector suction means associated with said conduit for cropping the yeast, said connector being adapted to permit rotation of said header pipe with respect to said conduit while fluid is flowing between said conduit and said header, and means for rotating said header.

7. A fermenter with a yeast cropping and cleaning device according to claim 6, wherein the rotating means is a gear device.

8. A fermenter with a yeast cropping and cleaning device according to claim 7 wherein the gear device is electrically operable.

9. A fermenter with a yeast cropping and cleaning device according to claim 7 wherein the gear device is hydraulically operable.

10. A fermenter vessel including a yeast cropping and cleaning device comprising a header pipe extending substantially horizontally in the upper portion of said fermenter vessel such that one end of the header extends through an end wall of the vessel, said header being adapted to rotate about a substantially horizontal axis and having a substantial portion of its length within the vessel offset from its axis of rotation, a series of orifices provided in the offset portion of the header, said orifices being arranged in a single row and being spaced from each other such that the distance between holes is progressively smaller as the holes become remote from said external end, conduit means connected to the external end of said header pipe by means of a connector suction means associated with said conduit for cropping the yeast, said connector being adapted to permit rotation of said header pipe with respect to said conduit while fluid is flowing between said conduit and said header, and a gear device adapted to rotate said header.

References Cited

UNITED STATES PATENTS

| | | | |
|---|---|---|---|
| 624,188 | 5/1899 | Davis | 137—240 |
| 2,440,161 | 4/1948 | Vaudreuil | 239—227 |
| 3,092,329 | 6/1963 | Twaroch | 239—227 |
| 3,101,730 | 8/1963 | Harris et al. | 134—167 |

A. LOUIS MONACELL, *Primary Examiner.*

N. ROSKIN, *Assistant Examiner.*